No. 115,490

UNITED STATES PATENT OFFICE.

WILLIAM AUGUSTUS LEGGO, OF MONTREAL, CANADA, ASSIGNOR TO HIMSELF AND GEORGE EDWARD DESBARATS, OF SAME PLACE.

IMPROVEMENT IN PROCESSES FOR OBTAINING MOLDS FOR ELECTROTYPING PURPOSES.

Specification forming part of Letters Patent No. 115,490, dated May 30, 1871.

*To all whom it may concern:*

Be it known that I, WILLIAM AUGUSTUS LEGGO, of the city of Montreal, in the Dominion of Canada, electrotypist, have invented a new and useful method for obtaining molds for electrotyping purposes, to be called or known as LEGGO's Molding Process for obtaining Molds for Electrotyping Purposes; and I do hereby declare that the following is a full, clear, and exact description thereof.

The method commonly adopted for obtaining wax molds from forms of type for electrotyping purposes is substantially as follows: The form of type, being ready, is placed upon the bed of the molding-press, where it is planed, slightly dusted with plumbago, and brushed so as to give it a non-adhesive surface. A sheet of wax is then prepared by pouring melted wax into a shallow pan, where it is allowed to cool; it is then freely dusted with plumbago and brushed, and is then inverted upon the form of type and subjected to pressure; having been pressed, the wax is removed from the form of type, and constitutes the mold for electrotyping. In rare instances this molding is all that is requisite, but in most cases the mold requires "building up"—that is, the supplying of extra wax to all the larger spaces of the mold for the purpose of giving, in the electrotype, sufficient depth for clean printing. This building up is a manual operation, requiring great care and dexterity, and occupying much time, thereby rendering the electrotype process expensive.

LEGGO's molding process for obtaining molds for electrotyping purposes differs from the preceding one in that it entirely dispenses with this building up, and produces a type more or less depressed in the spaces according as they are larger or smaller.

To enable those skilled in the art to work my invention, I will proceed to explain the making of a mold.

The form of type is placed upon the bed of a molding-press, when, having been planed, it is covered with a piece of wet mole-skin or its equivalent, which equivalent may consist of any other suitable soft membrane, fabric, or substance capable of receiving and retaining an impression from the types, when pressed thereupon, in the manner just described. A sheet of wax is then prepared by pouring melted wax into a shallow pan, or upon a metal plate, and allowing it to cool. As soon as it is sufficiently cool or set to enable the operator to handle it, it is inverted upon the form, covered, as before explained, and subjected to pressure. The pressure being removed, the wax is lifted off the form and constitutes the embryo mold. The mole-skin is next removed from the form of type, and the form being dried is slightly dusted with plumbago and brushed, so as to give it a non-adhesive surface. The embryo wax-mold, having been similarly treated, is inverted directly upon the form of type—the mole-skin not being used in this second operation—in precisely the same position that it occupied in the first pressing; pressure is again given so as to force the faces only of the type into the wax. The pressure being removed, the wax is lifted from the type, and is a perfect mold, requiring no building up, the requisite depths in the open spaces having been secured by the first pressing.

Although I consider wax to be the best material for use, as above described, I do not wish to be limited to its use, as other suitably soft substances capable of receiving and retaining impressions from types may be employed.

What I claim as new, and desire to secure by Letters Patent, is—

1. The mole-skin, or its equivalent, in the manner and for the purpose substantially as herein shown and described.

2. The employment of the wax sheet, or its equivalent, to receive the impression, in connection with the mole-skin, substantially as described.

3. The taking of a second impression from the face of the types upon the wax sheet, or its equivalent, substantially as described.

4. The general method, herein described, of obtaining finished molds for electrotype and other purposes.

The above specification of my invention signed by me this 16th day of November, 1870.

W. A. LEGGO.

Witnesses:
  R. REINHOLD,
  JAMES SLATER.